United States Patent
Lin et al.

(10) Patent No.: US 10,159,092 B2
(45) Date of Patent: Dec. 18, 2018

(54) UPLINK CONTENTION BASED MULTIPLE ACCESS FOR CELLULAR IOT

(71) Applicant: MEDIATEK INC., Hsinchu (TW)

(72) Inventors: Shiang-Jiun Lin, Hsinchu (TW); Gilles Charbit, Hampshire (GB); I-Kang Fu, Taipei (TW)

(73) Assignee: HFI Innovation INC., HsinChu (TW)

( * ) Notice: Subject to any disclaimer, the term of this patent is extended or adjusted under 35 U.S.C. 154(b) by 24 days.

(21) Appl. No.: 15/054,108

(22) Filed: Feb. 25, 2016

(65) Prior Publication Data
US 2016/0255654 A1    Sep. 1, 2016

Related U.S. Application Data

(60) Provisional application No. 62/121,020, filed on Feb. 26, 2015.

(51) Int. Cl.
*H04W 74/08* (2009.01)
*H04L 5/00* (2006.01)
(Continued)

(52) U.S. Cl.
CPC .............. *H04W 74/08* (2013.01); *H04L 1/00* (2013.01); *H04L 5/0037* (2013.01);
(Continued)

(58) Field of Classification Search
CPC ........ H04W 74/08; H04W 72/02; H04L 1/00; H04L 5/0037; H04L 5/0048; H04L 5/0055

See application file for complete search history.

(56) References Cited

U.S. PATENT DOCUMENTS

| 2009/0259910 A1 | 10/2009 | Lee et al. ........................ 714/748 |
| 2011/0243080 A1 | 10/2011 | Chen et al. ..................... 370/329 |

(Continued)

FOREIGN PATENT DOCUMENTS

| CN | 101695196 A | 4/2010 |
| CN | 102612852 A | 7/2012 |

(Continued)

OTHER PUBLICATIONS

International Search Report and Written Opinion of International Search Authority for PCT/CN2016/071954 dated Apr. 21, 2016 (11 pages).

(Continued)

*Primary Examiner* — Yemane Mesfin
*Assistant Examiner* — Henry Baron
(74) *Attorney, Agent, or Firm* — Imperium Patent Works; Helen Mao

(57) ABSTRACT

Methods and apparatus are provided contention based uplink data transmission. In one novel aspect, the contention-based uplink data channel is used to transmit the data directly to the network. In one embodiment, the UE selects an UL data channel from a set of preconfigured uplink contention based data channels and sends the UL data transmission on the selected UL data channel. In one embodiment, the contention based UL data has a narrow bandwidth with a long CP such that the TA is not needed from the base station. In another embodiment, a small signaling payload is included in the CB UL data transmission if the size of the data contents cannot be fit in the UL data channel. In one embodiment, the signaling payload is the BSR. The UE, subsequently, receives an UL grant and sends the remaining data contents using the allocated data channel in the UL grant.

18 Claims, 5 Drawing Sheets

(51) Int. Cl.
*H04L 1/00* (2006.01)
*H04W 72/02* (2009.01)
*H04L 1/18* (2006.01)

(52) U.S. Cl.
CPC .......... *H04L 5/0048* (2013.01); *H04L 5/0055* (2013.01); *H04W 72/02* (2013.01); *H04L 1/1867* (2013.01); *H04W 74/0833* (2013.01)

(56) References Cited

U.S. PATENT DOCUMENTS

| | | | |
|---|---|---|---|
| 2011/0299415 A1 | 12/2011 | He et al. | 370/252 |
| 2012/0044816 A1* | 2/2012 | Ratasuk | H04L 1/1657 370/252 |
| 2012/0127930 A1 | 5/2012 | Nguyen et al. | 370/329 |
| 2012/0236816 A1 | 9/2012 | Park et al. | 370/329 |
| 2012/0287877 A1 | 11/2012 | Han et al. | 370/329 |
| 2013/0102320 A1 | 4/2013 | Suzuki et al. | 455/452.1 |
| 2013/0287064 A1 | 10/2013 | Seo et al. | 375/144 |
| 2014/0071936 A1* | 3/2014 | Zhang | H04L 25/0226 370/330 |
| 2014/0169323 A1 | 6/2014 | Park et al. | 370/329 |
| 2014/0177491 A1 | 6/2014 | Hao et al. | 370/280 |
| 2015/0215881 A1* | 7/2015 | Parkvall | H04W 56/002 370/350 |
| 2015/0282214 A1 | 10/2015 | Lee et al. | 370/329 |
| 2015/0365976 A1 | 12/2015 | Lee et al. | 455/422.1 |
| 2016/0183219 A1 | 6/2016 | Kim et al. | 370/329 |

FOREIGN PATENT DOCUMENTS

| | | |
|---|---|---|
| CN | 103069913 A | 4/2013 |
| WO | WO2012071348 A1 | 5/2012 |
| WO | WO2014065593 A1 | 5/2014 |

OTHER PUBLICATIONS

System messages and random access process in LTE (no English translation is available).
International Search Report and Written Opinion of International Search Authority for PCT/CN2016/074660 dated May 17, 2016 (11 pages).
USPTO, Office Action for related U.S. Appl. No. 15/004,196 dated Sep. 12, 2017 (31 pages).
EPO, search report for the EP patent application 16754776.9 dated Feb. 5, 2018 (10 pages).
Kaijie Zhou et al., "Contention based access for machine-type communications over LTE", 2012 IEEE 75th Vehicular Technology Conference, Yokohama, Japan, May 6-9, 2012, pp. 1-5, *Section II: figures 3,4*.
EPO, search report for the EP patent application 16739812.2 dated Feb. 14, 2018 (8 pages).

* cited by examiner

UPLINK CONTENTION BASED MULTIPLE ACCESS FOR CELLULAR IOT

CROSS REFERENCE TO RELATED APPLICATIONS

This application claims priority under 35 U.S.C. § 119 from U.S. Provisional Application No. 62/121,020 entitled, "Uplink Contention Based Multiple Access for Cellular IoT" filed on Feb. 26, 2015; the subject matter of which is incorporated herein by reference.

TECHNICAL FIELD

The disclosed embodiments relate generally to wireless communication, and, more particularly, to Uplink Contention Based Multiple Access for Cellular Internet over the Thing (IoT).

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting massive machine communications increases exponentially. IoT air interface will need to support both high connection density for massive IoT devices and low radio latency for reliable communication application. In addition, the network coverage is critical to connect various IoT devices in the field, and thus it is more reasonable to support the IoT communications over lower frequency bands.

In LTE, devices can obtain the UL grant through either dedicated scheduling request (SR) or random access (RA) procedure. SR allows multiple users multiplexing together with different cyclic shifts and orthogonal sequences to occupy the dedicated resource elements (REs) on the physical uplink control channel (PUCCH). At most thirty-six devices can be multiplexed together for SR in one physical resource block (PRB) on PUCCH. This method cannot meet the requirement for massive deployment of IoT or other types of machine type communication (MTC) devices. The RA process is a four-step process designed for initial cell access and UL grant request. The four-step introduces a lot of signaling overheads and delay in the set up. With the massive amount of IoT or MTC devices deployed, the regular RA process becomes inefficient. It also creates increasing number of collisions, which in turn aggravate the inefficiency of bandwidth use and system performance.

Improvements and enhancements are needed for the LTE random access procedure and the LTE SR procedure.

SUMMARY

Methods and apparatus are provided contention based uplink data transmission. In one novel aspect, the contention-based uplink data channel is used to transmit the data directly to the network. In one embodiment, the UE selects an UL data channel from a set of preconfigured uplink contention based data channels. The UE generates the UL data transmission, which includes an identification of the UE and the UL data contents. The UE sends the UL data transmission on the selected UL data channel and receives a response for the UL data transmission. In one embodiment, the contention based UL data has a narrow bandwidth with a long cyclic prefix (CP) such that the timing advance (TA) is not needed from the base station. In one embodiment, the set of contention based UL data channels is preconfigured by the RRC message. In another embodiment, the set of contention based UL data channels is preconfigured by a broadcast message, such as the system information. In another embodiment, a small signaling payload is included in the contention based UL data transmission if the size of the data contents cannot be fit in the UL data channel. In one embodiment, the signaling payload is the BSR. The UE, subsequently, receives an UL grant. In one embodiment, the contention based UL data transmission with the signaling payload also includes part of the data contents. The remaining data contents are sent using the allocated data channel in the UL grant. In another embodiment, a DMRS is selected from a set of preconfigured DMRS seeds.

In another novel aspect, the simplified UL data procedure is to include a small signaling payload, such an UE ID, as a scheduling request (SR) for UL resource grant. In one embodiment, the network response with a contention resolution with a UL grant. The UE sends the UL data transmission on the UL data channel indicated in the UL grant.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
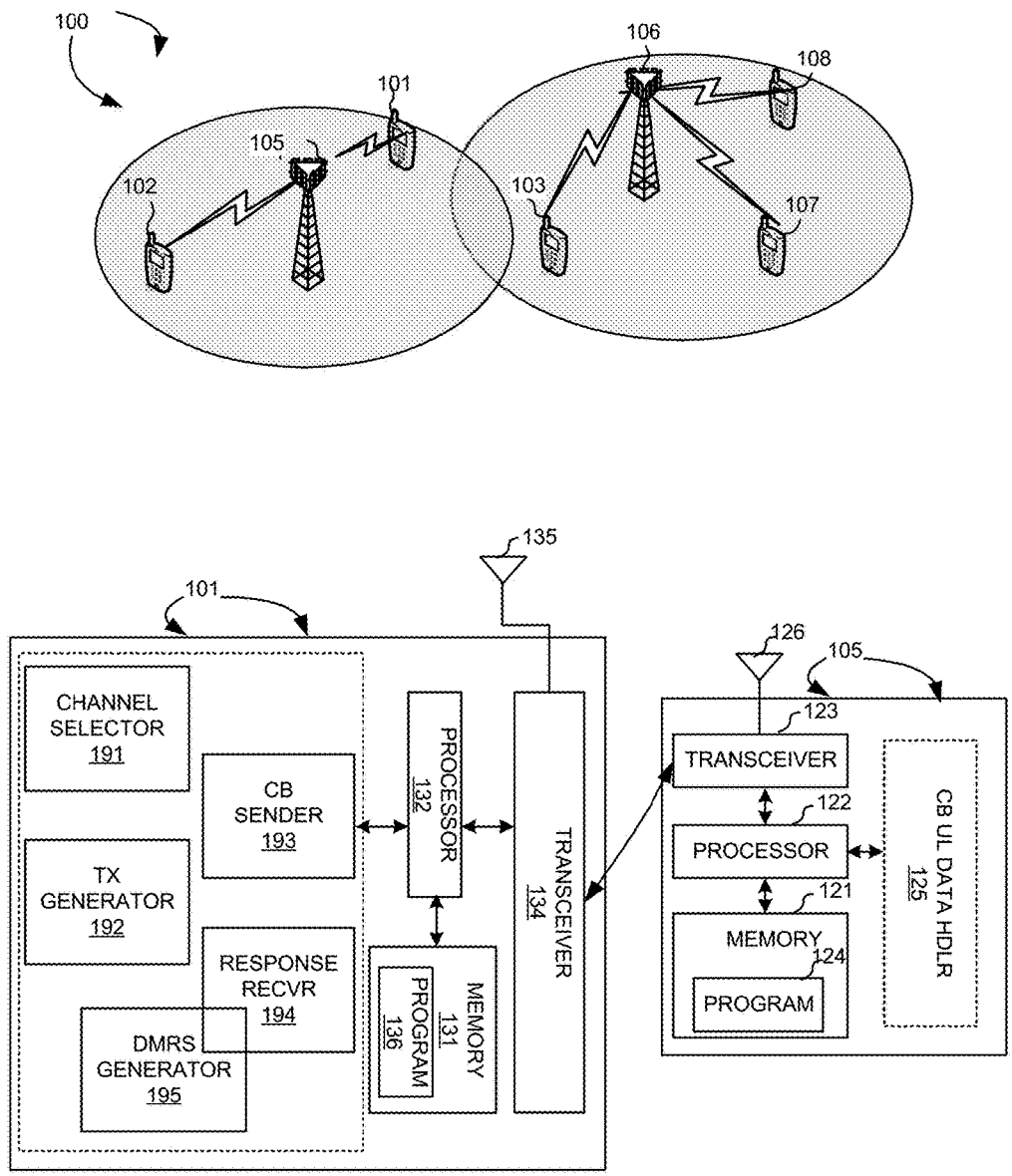
FIG. 1 illustrates an exemplary wireless network with simplified uplink data transmission in accordance with embodiments of the current invention.

FIG. 1 illustrates an exemplary wireless network 100 with simplified uplink data transmission in accordance with embodiments of the current invention. Wireless communications system 100 includes one or more wireless networks, and each of the wireless communication networks has fixed base infrastructure units, such as 105 and 106. The base units may also be referred to as an access point, an access terminal, a base station, eNB, or by other terminology used in the art. Each of the base stations 105 and 106 serves a geographic area. The geographic area served by wireless communications stations 105 and 106 overlaps in this example.

UEs 101 and 102 in the wireless network 100 are served by base station 105. Other UEs, such as UEs 103, 107 and 108, are served by a different base station 106. With the growing number of UEs in the system, the SR procedure cannot support the amount of devices. Further, the four-step RA procedure creates a large percentage of signaling overhead. With the increasing number of devices in the network, the overhead decreases the system efficiency and creates large opportunities for collision both in the signaling setup and the data transmission, which in turn, further lowers the perform of the system.

Further, there may by DMRS issues for the initial PUSCH scheduled by the RAR grant. DMRS in uplink transmission is used for channel estimation and for coherent demodulation, which comes along with PUSCH and PUCCH. For the DMRS for the initial PUSCH scheduled by RAR grant, all UEs will use the same seed, where the seed is related to cell ID and other parameters broadcasted in the system information, i.e., SIB2. The UE uses the seed to generate the pseudo-random sequence for the reference signal sequence. The reference signal will be transmitted by the UEs using the same preamble ID in Msg1 in the same resource block. Thus, when the eNB performs the channel estimation, it will see a composite channel from all transmitted UE. If the eNB applies the composite channel result to decode the UE specific Msg3 in PUSCH, with high probability, the PUSCH cannot be decoded correctly. If DMRS is bad or is not decoded properly by eNB, PUSCH or PUCCH will be not decoded as well.

Second, the timing advance is needed for the original four-step RA procedure. When the preamble is detected by the eNB, the eNB will indicate a timing advance (TA) in RAR to a specific UE. All the UEs transmitting the same preamble ID and receiving the same RAR will apply this timing advance when transmitting their corresponding messages. Although the UEs' location may be different and when they apply the same TA, the timing of these messages to eNB may be different. However, as long as the receiving of all CB UL data channel (TA and delay spread) is within the cyclic prefix length at the eNB, the eNB will treat these signals the same as multipath phenomena. Since these messages carry different contents, they will severely interfere with each other. If eNB cannot successfully decode the message, it will transmit NACK to the UEs. The UEs receive the NACK will re-transmit their redundancy version of the messages. In such case, with high probability, the transmission and re-transmission of the messages may collide until the maximum number of messages transmission is reached.

In one novel aspect, an SR request is sent to the network with a small field indicating it is the SR request. In another novel aspect, a RA is modified by sending an UL contention based data channel. There is no need for the four-step setup. The UE upon detecting the requirement for an UL data, it sends the UL data directly for a contention based communication. If the size of the data fits in the UL data channel, the data is sent. Upon successful decoding the UL data, the eNB replies with an ACK. If the data is not correctly received, the eNB sends back a NACK. The UE upon receiving a NACK can randomly pick another UL contention based channel and retransmits the data. The contention based UL data transmission reduces the signaling overhead.

FIG. 1 further shows simplified block diagrams of UE 101 and base station 105 in accordance with the current invention.

Base station 105 has an antenna array 126 comprising one or more antennas, which transmit and receive radio signals. A RF transceiver module 123, coupled with the antenna, receives RF signals from antenna array 126, converts them to baseband signals, and sends them to processor 122. RF transceiver 123 also converts received baseband signals from processor 122, converts them to RF signals, and sends out to antenna array 126. Processor 122 processes the received baseband signals and invokes different functional modules to perform features in base station 105. Memory 121 stores program instructions and data 124 to control the operations of base station 102. Base station 105 also includes a set of control modules, such as a contention based (CB) uplink data handler 125, which configures and handles CB uplink data related features.

UE 101 has an antenna array 135 with a single antenna, which transmits and receives radio signals. A RF transceiver module 134, coupled with the antenna, receives RF signals from antenna array 135, converts them to baseband signals, and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A channel selector 191 selects an uplink (UL) contention-based (CB) data channel, wherein the UL data channel is selected from a set of preconfigured UL CB data channels. A transmission generator 192 generates an UL data transmission, wherein the UL data transmission includes at least an identification (ID) of the UE and UL data contents. CB sender 193 sends the UL data transmission on the selected UL CB data channel to a base station. A response receiver 194 receives a response for the UL data transmission from the base station. A DMRS generator 195 obtains a set of DMRS seeds, selects a transmission DMRS seed from the set of DMRS seeds, generates a DMRS using the selected transmission DMRS seed, and sends the data transmission using the generated DMRS on the selected UL contention data channel.

In one novel aspect, the simplified UL data procedure is to include a small signaling payload, such an UE ID, as a scheduling request (SR) for UL resource grant. In another novel aspect, the simplified UL data procedure is to include a small data payload in the first step of the random access procedure and uses a CB uplink data channel for the uplink data transmission.

Figure 2:
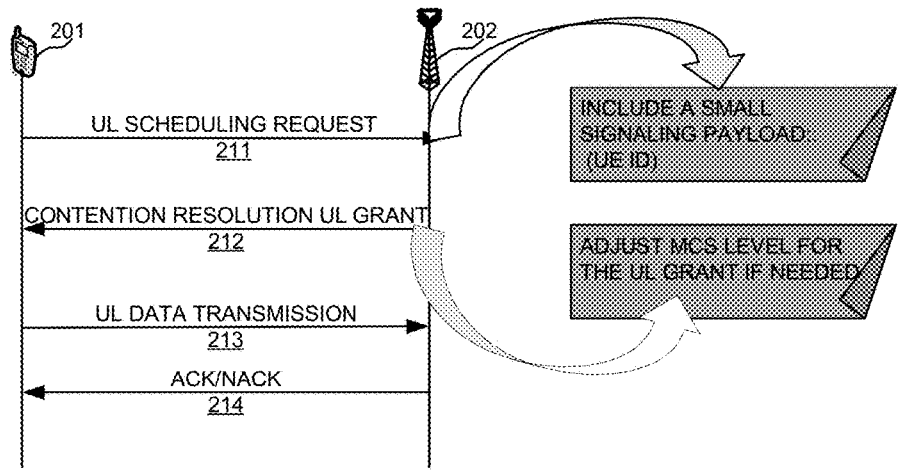
FIG. 2 illustrates an exemplary flow chart of the procedure to include a small signaling payload, such an UE ID, as a scheduling request (SR) for UL resource grant in accordance with embodiments of the current invention.

FIG. 2 illustrates an exemplary flow chart of the procedure to include a small signaling payload, such an UE ID, as a scheduling request (SR) for UL resource grant in accordance with embodiments of the current invention. A UE 201 is connected with an eNB 202 in a wireless network. At step 211, UE 201 sends a UL SR. The UL SR in step 211 includes a small signaling payload. In one embodiment, the signaling payload is the UE ID of UE 201. At step 212, eNB 202 replies with a contention resolution with an UL grant to UE 201. In one embodiment, eNB 202 adjusts the modulation and coding scheme (MCS) level based on UE information in the UL SR. In one embodiment, eNB 202 upon detecting UE being an IoT device, a MTC device, or other low cost devices, eNB 202 lowers the MCS level in the UL grant. UE 201, upon receiving the contention resolution UL grant adjusts its MCS level if needed and sends UL data transmission to eNB 202 at step 213. At step 214, eNB 202 replies an ACK or a NACK upon receiving the UL data transmission. If the UL data transmission is received successfully, eNB 202 replies with an ACK at step 214. If the UL data transmission is not received successfully, eNB 202 replies with a NACK at step 214.

Figure 3:
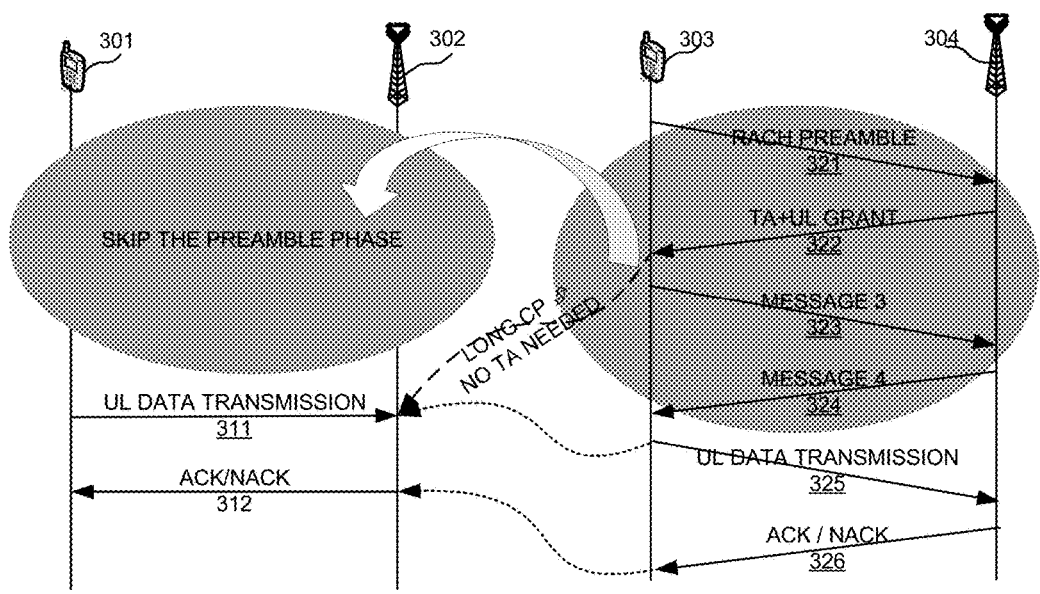
FIG. 3 illustrates an exemplary flow chart of the procedure to include a small data payload in the first step of the random access procedure and uses a CB uplink data channel for the uplink data transmission in accordance with embodiments of the current invention.

FIG. 3 illustrates an exemplary flow chart of the simplified procedure to include a small data payload in the first step of the random access procedure and uses a CB uplink data channel for the uplink data transmission in accordance with embodiments of the current invention. FIG. 3 illustrates a four-step RA procedure. A UE 303 connects with an eNB 304 in a wireless network. UE 303 transmits UL data using the four-step RA procedure. At step 321, UE 303 sends a random access channel (RACH) preamble to eNB 304. At step 322, eNB 304 replies with a UL grant, which includes a timing advance (TA). At step 323, UE 303 sends a Message-3. At step 3024, eNB 304 replies with a Message-4. At step 325, UE 303 using the granted UL channel sends the UL data transmission. At step 326, eNB 304 sends ACK or NACK to UE 303.

As shown, steps 321 to 324 establish an UL data transmission channel. The channel is assigned by the eNB and it is contention free. However, the four-step UL data channel procedure introduces heavy signaling overhead. Further, when the number of UE, such the IoT devices, MTC devices, increases, the collision of the RA procedure increases, which further lowers the system performance. In one novel aspect, the four-step RA procedure is simplified as shown. A UE 301 is connected with an eNB 302 in a wireless network. Unlike UE 303, UE 301 skips the four-step RA procedure. At step 311, UE 301 selects a CB UL data channel and directly sends an UL data transmission. eNB 302, upon receiving the UL data transmission form UE 301, replies with an ACK if the data packets are decoded correctly, or with a NACK if the data packets are not decoded correctly.

In one embodiment, a longer cyclic prefix (CP) is used to remove the need for timing advance adjustment to pre-synchronize devices on the UL. Different physical layer structure design is necessary to support it. As an example, the SC-FDMA waveform format can be used at the UE transmitter side with a subcarrier spacing of 3.75 kHz instead of the 15 kHz used in the current LTE system. A CP of 66.67 μs can be added, making it longer than the 4.7 μs CP used in LTE. With this waveform numerology, a 1-ms subframe can accommodate three SC-FDMA symbols including the CP. The longer CP tolerates time misalignment in a large area. With the longer CP length, eNB 302 does not need to send the TA command to the UE. The simplified two-step contention based UL access procedure can be achieved. The signaling overhead is greatly reduced.

Figure 4A:
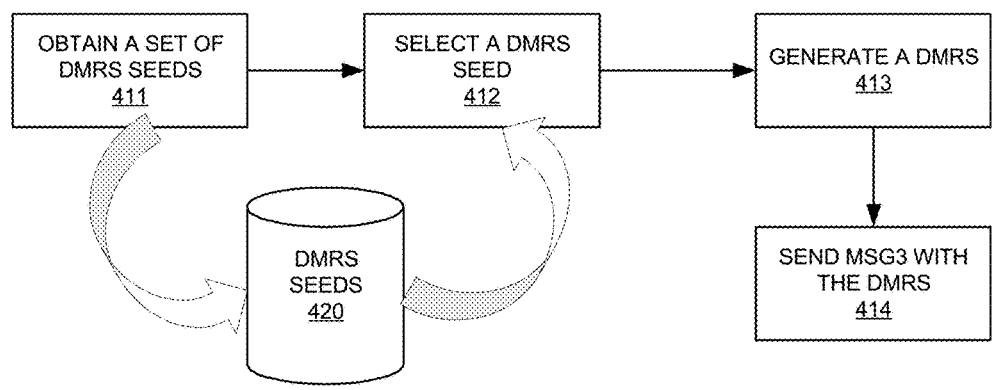
FIG. 4A illustrates an exemplary diagram for DMRS sequence generation in accordance with embodiments of the current invention.
Figures 4B, 4C:
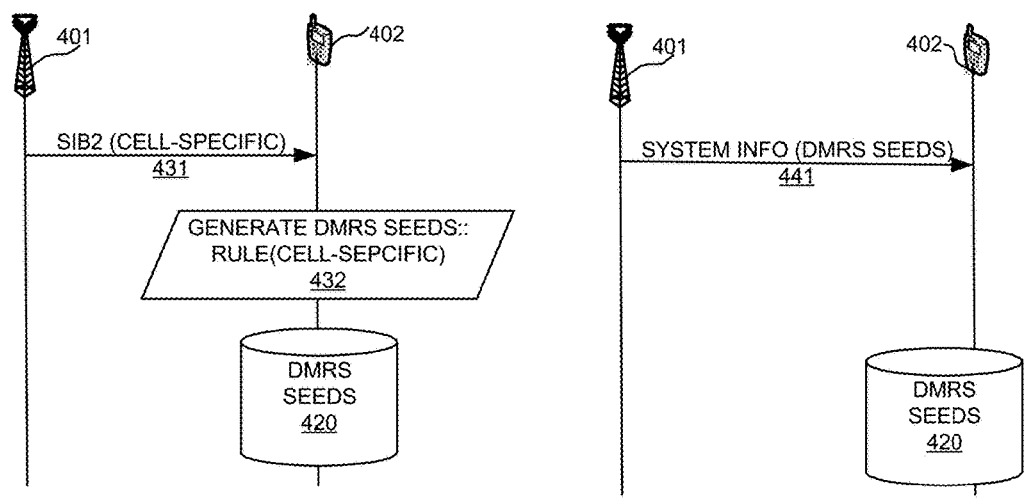
FIG. 4B illustrates an exemplary diagram for obtaining the set of DMRS seeds based on a cell-specific value from the network in accordance with embodiments of the current invention.
FIG. 4C illustrates an exemplary diagram for obtaining the set of DMRS seeds from the system information message in accordance with embodiments of the current invention.

In one embodiment, DMRS sequence generation is used to reduce the CB UL data channel collision. In order to reduce CB UL data channel collision probability, the network can provide a set of generation seeds of the DMRS for CB UL data channel. The UEs transmitting their CB UL data channel can randomly choose a seed to generate its DMRS for the CB UL data channel transmission. In this way, even if multiple UEs transmit the same preamble, a further randomization of DMRS can be provided so that the probability of multiple UEs using the same DMRS can be reduced. Thus, eNB can estimate UE's channel by detecting individual DMRS. The CB UL data channel collision probability can be reduced. Besides, the DMRS detection complexity is acceptable because the eNB should only detect DMRS within a limited set. FIGS. 4A, 4B, and 4C illustrate the embodiments of DMRS sequence generation.

FIG. 4A illustrates an exemplary diagram for DMRS sequence generation in accordance with embodiments of the current invention. At step 411, the UE obtains a set of DMRS seeds 420. At step 412, the UE selects a DBMS seed from the set of DMRS seeds 420. At step 413, the UE generates a DMRS sequence based on the selected DMRS seed. At step 414, the UE sends the CB UL data channel using the generated DMRS sequence.

FIG. 4B illustrates an exemplary diagram for obtaining the set of DMRS seeds based on a cell-specific value from the network in accordance with embodiments of the current invention. The set of the DMRS generation seeds can follow a pre-defined rule to generate. For example, the eNB broadcasts a cell specific parameter in SIB2. UEs can use a pre-defined rule to generate the set of seeds and randomly pick up a seed to generate the DMRS. In the eNB side, eNB can use the pre-defined rule to detect the DMRS sequence. A UE 402 connects with an eNB 401. At step 431, eNB 401 sends a cell-specific parameter to UE 402. In one embodiment, the cell-specific parameter is sent in the SIB2 message. At step 432, UE 402 generates a set of DMRS seeds. In one embodiment, the set of DMRS seeds is generated based on the cell-specific parameter and a predefined rule. UE 402 maintains DMRS seeds 420.

FIG. 4C illustrates an exemplary diagram for obtaining the set of DMRS seeds from the system information message in accordance with embodiments of the current invention. In another embodiment, the set of DMRS generation seeds can be broadcasted in the system information. An UE 402 connects with eNB 401. At step 441, eNB 401 sends a set of DMRS to UE 402 using system information.

In one embodiment, a signaling payload is included in the CB UL data transmission if the size of the data transmission cannot be fit in the allocated one CB UL data channel. In one embodiment, a buffer status report (BSR) is included in the CB UL data transmission together with part of the data transmission. The eNB upon receiving the UL data transmission will send an UL grant back to the UE for additional data transmission.

Figure 5:
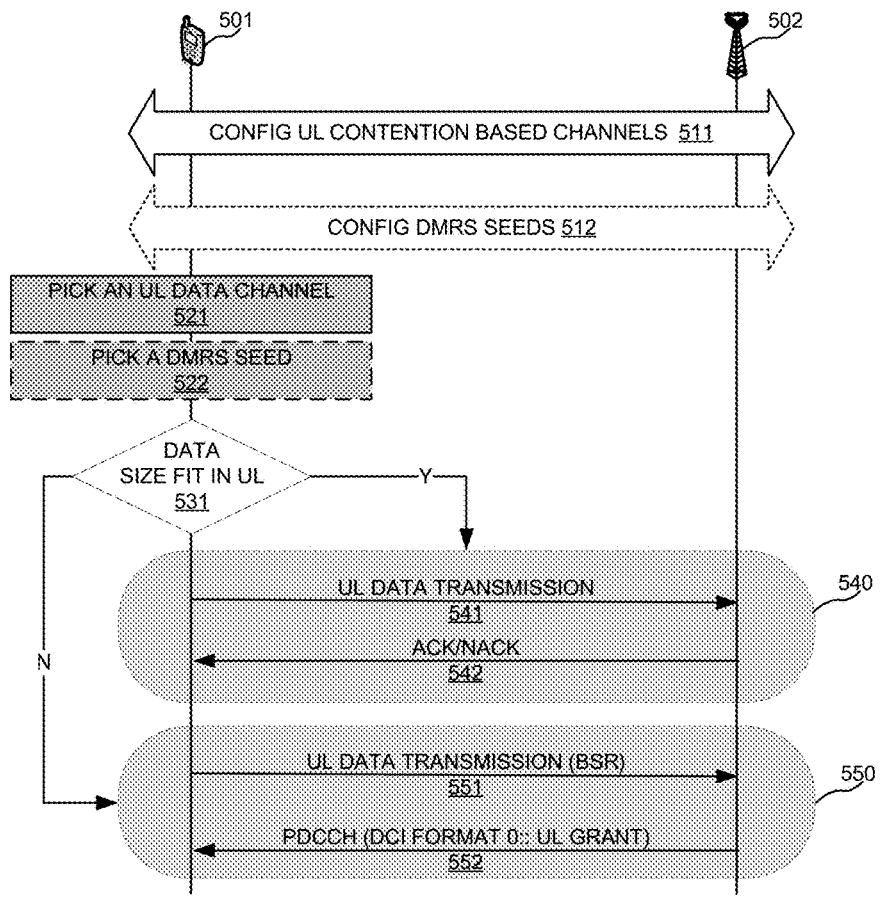
FIG. 5 shows an exemplary flow chart for the CB UL data transmission with a signaling payload for additional data transmission in accordance with embodiments of the current invention.

FIG. 5 shows an exemplary flow chart for the CB UL data transmission with a signaling payload for additional data transmission in accordance with embodiments of the current invention. A UE 501 is connected with an eNB 502 in a wireless network. At step 511, UE 501 configures a set of UL contention based data channel. In one embodiment, the configuration is done through radio resource control (RRC) messages. In another embodiment, the network configures the set of CB UL data channels through broadcast messages, such as system information. In yet another embodiment, the set of CB UL data channels can be configured by the operator. In one embodiment, optionally, UE 501 receives DMRS seeds configuration from the network at step 512. At step 521, UE 501 picks an UL data channel from the preconfigured set of CB UL data channels. In one embodiment, UE 501 randomly picks the CB UL data channel. At step 522, optionally, UE picks a DMRS seed from the preconfigured set of DMRS seeds. If UE 501 picks the DMRS seed, the following CB UL data transmission is encoded with the selected DMRS. At step 531, UE 501 determines the size of the data to be transmitted. If the size is smaller than the maximum allowed data portion for the selected CB UL data channel, UE 501 moves scenario 540. Under scenario 540, UE 501 packs the data to the CB UL data channel and sends the UL data transmission. eNB 502 upon receiving the data transmission, sends an ACK if the data is successfully received, otherwise, eNB 502 sends a NACK to UE 501. If step 531 determines that the size of the data to be transmitted cannot be fit in the CB UL data channel, it moves scenarios 550. At scenario 550, UE 501 sends the UL data transmission with a signaling payload at step 551. In one embodiment, the signaling payload is the BSR. eNB 502 upon successfully receiving the UL data transmission sends a PDCCH with a UL grant using DCI format-0 at step 552. In one embodiment, the UL data transmission at step 551 includes part of the data to be transmitted. Upon receiving the UL grant sent at step 552, UE 501 sends the remaining data using the data channel assigned in the UL grant.

Figure 6:
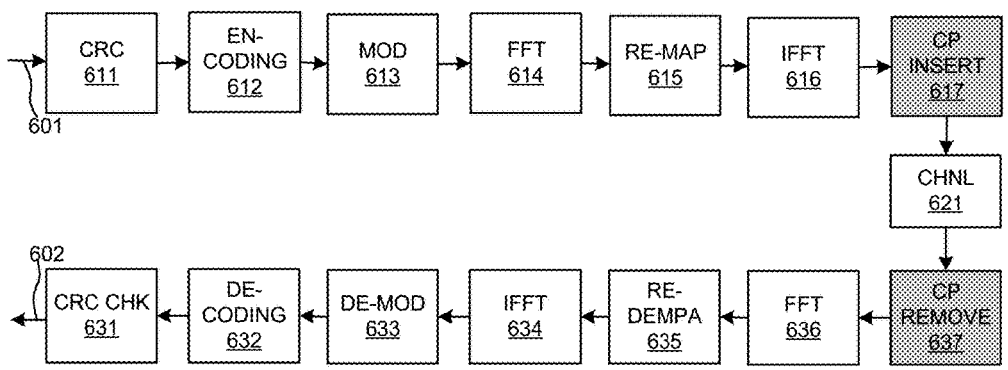
FIG. 6 illustrates an exemplary block diagram of the physical abstraction model showing the simplified UL data transmission in accordance with embodiments of the current invention.

FIG. 6 illustrates an exemplary block diagram of the physical abstraction model showing the simplified UL data transmission in accordance with embodiments of the current invention. An input data stream 601 is received. In one embodiment, a 16-bit UE ID is included. A CRC module 611 adds CRC check. For example, an 8-bit CRC is added to the 16-bit UE ID. An encoding unit 612 encodes the data payload. For example, the data payload passes a tail biting convolutional encoding (TBCC). The encoded data stream then passes through a modulator 613. In one embodiment, modulator 613 is a QPSK modulator. The modulated signals go through a fast Fourier transform (FFT) module 614, followed by a resource element (RE) mapping module 615. The signal is then passed inverse FFT (IFFT) module 616 to generate the SC-FDMA waveform. In one embodiment, a CP is added to preserve the circular convolution property via a CP inserter 617. In one embodiment, a long CP is inserted for CB UL data transmission such that the TA is not needed. The signal is transmitted through radio channel 621. At the eNB receiver, the CP is removed by a CP remover 637. The signal is then passed through a FFT module 636, a RE de-mapping module 635 and an IFFT processing module 634. A de-modulator 633 demodulates the signal. A decoding module 632 decodes the signal. In one embodiment, decoding module 632 is a TBCC decoder. A CRC checking module 631 checks the CRC. If the CRC check is successful, the 16-bit UE ID and the rest small data payload may be retrieved. The successfully received signal is sent as output 602.

Figure 7:
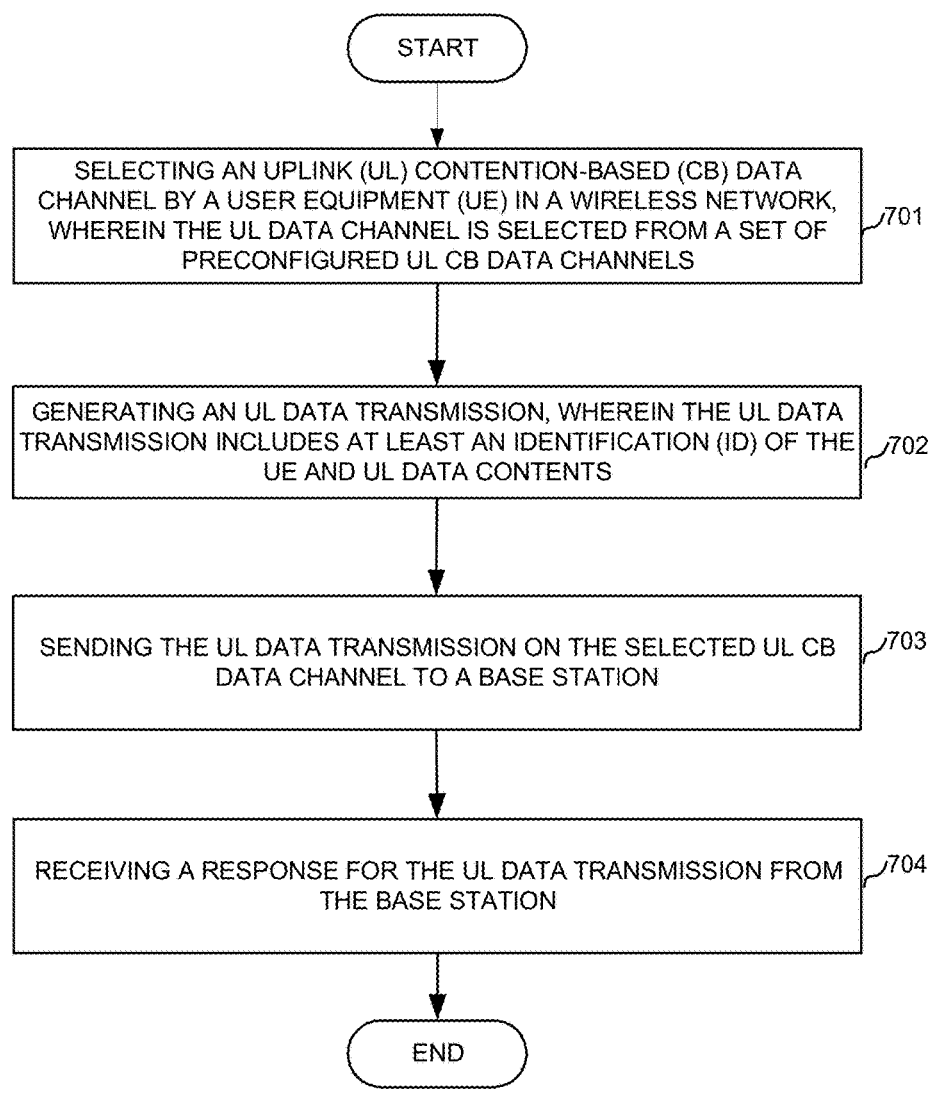
FIG. 7 is an exemplary flow chart for the simplified UL data transmission procedure using the contention-based UL data channel in accordance with embodiments of the current invention.

FIG. 7 is an exemplary flow chart for the simplified UL data transmission procedure using the contention-based UL data channel in accordance with embodiments of the current invention. At step 701, the UE selects an UL contention-based data channel in a wireless network, wherein the UL data channel is selected from a set of preconfigured UL CB data channels. At step 702, the UE generates an UL data transmission, wherein the UL data transmission includes at least an identification (ID) of the UE and UL data contents. At step 703, the UE sends the UL data transmission on the selected UL CB data channel to a base station. At step 704, the UE receives a response for the UL data transmission from the base station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   selecting an uplink (UL) contention-based (CB) data channel by a user equipment (UE) in a wireless network, wherein the UL data channel is selected from a set of preconfigured UL CB data channels;
   generating an UL data transmission, wherein the UL data transmission includes at least an identification (ID) of the UE and UL data contents;
   obtaining a plurality of demodulation reference signal (DMRS) seeds from the wireless network;
   selecting a transmission DMRS seed from the set of DMRS seeds;
   generating a DMRS using the selected transmission DMRS seed;
   sending the UL data transmission using the generated DMRS on the selected UL CB data channel to a base station; and
   receiving a response for the UL data transmission from the base station, wherein the received response indicates a reception status of the UL data transmission.

2. The method of claim 1, wherein the UL CB data channel has a narrow bandwidth with a long cyclic prefix (CP) such that a timing advance (TA) from the base station is avoided.

3. The method of claim 1, wherein the set of preconfigured UL contention data channels is configured by a radio resource control (RRC) message or a broadcast system information message.

4. The method of claim 1, wherein the response from the base station is an ACK/NACK.

5. The method of claim 1, further comprising:
   detecting a size of the UL data contents being larger than a UL data channel capacity, wherein the UL data channel capacity is a maximum data size the UL CB data channel can include; and
   generating the data transmission to further include an indicator for UL grant request, wherein the data transmission includes part of the UL data contents.

6. The method of claim 5, wherein, the UL grant request is a buffer status report (BSR).

7. The method of claim 5, wherein the response from the base station is an UL grant, wherein the UL grant includes dedicated UL data channel for transmitting remaining UL data contents.

8. The method of claim 1, wherein the obtaining the plurality of DMRS seeds comprising:
   receiving a cell-specific parameter from the wireless network in a SIB2; and
   generating the set of DMRS seeds based on a pre-defined rule and the received cell-specific parameter.

9. The method of claim 1, wherein the obtaining the set of DMRS seeds involves: receiving the set of DMRS seeds from a broadcast system information message.

10. A user equipment (UE), comprising:
    a radio frequency (RF) transceiver that transmits and receives radio signals in a wireless network;
    a channel selector that selects an uplink (UL) contention-based (CB) data channel, wherein the UL data channel is selected from a set of preconfigured UL CB data channels;

a transmission generator that generates an UL data transmission, wherein the UL data transmission includes at least an identification (ID) of the UE and UL data contents, obtains a set of demodulation reference signal (DMRS) seeds from the wireless network, selects a transmission DMRS seed from the set of DMRS seeds, generates a DMRS using the selected transmission DMRS seed;

a CB sender that sends the UL data transmission using the generated DMRS seed on the selected UL CB data channel to a base station; and a response receiver that receives a response for the UL data transmission from the base station, wherein the received response indicates a reception status of the UL data transmission.

11. The UE of claim 10, wherein the UL CB data channel has a narrow bandwidth with a long cyclic prefix (CP) such that a timing advance (TA) from the base station is avoided.

12. The UE of claim 10, wherein the set of preconfigured UL contention data channels is configured by a radio resource control (RRC) message or a broadcast system information message.

13. The UE of claim 10, wherein the response from the base station is an ACK/NACK.

14. The UE of claim 10, wherein the transmission generator detects a size of the UL data contents being larger than a UL data channel capacity, wherein the UL data channel capacity is a maximum data size the UL CB data channel can include, and generates the data transmission to further include an indicator for UL grant request, wherein the data transmission includes part of the UL data contents.

15. The UE of claim 14, wherein, the UL grant request is a buffer status report (BSR).

16. The UE of claim 14, wherein the response from the base station is an UL grant, wherein the UL grant includes dedicated UL data channel for transmitting remaining UL data contents.

17. The UE of claim 10, wherein the obtaining the plurality of DMRS seeds comprising:
receiving a cell-specific parameter from the wireless network in a SIB2; and
generating the set of DMRS seeds based on a pre-defined rule and the received cell-specific parameter.

18. The UE of claim 10, wherein the obtaining the plurality of DMRS seeds involves: receiving the set of DMRS seeds from a broadcast system information message.

* * * * *